United States Patent [19]

Ostrowsky

[11] Patent Number: 4,458,821
[45] Date of Patent: Jul. 10, 1984

[54] TAMPER-INDICATING CLOSURE

[75] Inventor: Efrem M. Ostrowsky, Highland Park, Ill.

[73] Assignee: Ethyl Molded Products Company, Richmond, Va.

[21] Appl. No.: 448,064

[22] Filed: Dec. 9, 1982

[51] Int. Cl.³ .......................................... B65D 41/34
[52] U.S. Cl. .................................... 215/252; 215/253
[58] Field of Search ............... 215/250, 252, 253, 258

[56] References Cited

U.S. PATENT DOCUMENTS

| | | | |
|---|---|---|---|
| 3,374,913 | 3/1968 | Zipper | 215/252 |
| 3,484,012 | 12/1969 | White et al. | 215/252 |
| 3,861,551 | 1/1975 | Hannon | 215/252 |
| 4,157,144 | 6/1979 | Weiler et al. | 215/252 |
| 4,291,813 | 9/1981 | Allen et al. | 215/252 |
| 4,394,918 | 7/1983 | Grussen | 215/253 |
| 4,401,227 | 7/1983 | Pehr | 215/252 |

FOREIGN PATENT DOCUMENTS

| | | | |
|---|---|---|---|
| 49876 | 4/1982 | European Pat. Off. | 215/252 |
| 2213773 | 9/1973 | Fed. Rep. of Germany | 215/252 |
| 3025751 | 2/1982 | Fed. Rep. of Germany | 215/252 |
| 2291915 | 6/1976 | France | 215/252 |
| 2421812 | 12/1979 | France | 215/252 |
| 2034674 | 6/1980 | United Kingdom | 215/252 |

Primary Examiner—Joseph Man-Fu Moy
Assistant Examiner—David T. Fidei
Attorney, Agent, or Firm—Donald L. Johnson; John F. Sieberth

[57] ABSTRACT

This invention relates to a thermoplastic tamper-indicating closure. The closure features a top wall and an annular downwardly depending sidewall. Connected to the lower end of the annular sidewall by way of an annular area is an annular tamper-indicating band. The annular area has a frangible and a non-frangible portion. The tamper-indicating band has a vertical frangible area which extends across its width and which is preferably generally opposite the non-frangible area. The tamper-indicating band also features an annular upper portion which depends downwrdly from the annular area. The band additionally has an annular lower portion hingedly connected to the annular upper portion and which comprises a plurality of spaced apart tabs with each tab connected to its neighboring tab by way of a flexible web. Each of the tabs preferably has a scalloped recess at their lower extent to provide some circumferential flexibility when the annular lower portion of the band is hinged inwardly from its molded position to its utilitarian position.

21 Claims, 15 Drawing Figures

TAMPER-INDICATING CLOSURE

BACKGROUND OF THE INVENTION

The utilization of tamper-indicating closures, in which the closure is of a thermoplastic material, is receiving wide acceptability in the marketplace. Such closures will become even more market dominant upon their acceptance by the carbonated beverage industry. Exemplary of various types of tamper-indicating closures are the ones shown in U.S. Pat. Nos. 3,329,295, 3,438,528, 3,784,041, 4,126,240, 4,147,268, 4,196,818, 4,206,851, and 4,305,516.

It is an object of this invention to provide a tamper-indicating closure which features high fidelity in operation and simplicity in construction and manufacture and which does not leave a tamper-indicating portion with the container upon removal of the closure therefrom.

THE INVENTION

This invention relates to an integrally-formed tamper-indicating thermoplastic closure for fitment to a container having a threaded neck portion and an outwardly extending annular flange adjacent to and beneath the threaded neck portion. The thermoplastic closure of this invention can be produced by conventional injection-molding techniques. A particularly useful thermoplastic material, from which the closures of this invention can be made, is polypropylene. However, other thermoplastic materials may be useful such as polyethylene terephthalate, high-density polyethylene, nylon, polyvinyl chloride, etc.

The closure of this invention features a conventional top wall and an annular sidewall downwardly depending therefrom. About the inside surface of the annular sidewall, there is provided a closure thread for cooperation with the container thread to achieve fitment of the closure to the container. Connected to the lower end of the annular sidewall is an annular tamper-indicating band. This connection is made by way of an annular area which comprises a frangible portion and a non-frangible portion. The annular tamper-indicating band is dimensioned, along with the annular area and the annular sidewall, so that the band will at least partially extend to a point beneath the container's outwardly extending annular flange when the closure is fitted to the container. The annular area can be of any configuration which allows for fracturing of the frangible portion upon attempted removal of the closure from the container but does not allow for fracturing in the non-frangible portion. A preferred configuration features a plurality of spaced apart fracturable bridges which comprise the frangible portion and a non-fracturable bridge which comprises the non-frangible portion. Fracture of the frangible portion results in only partial separation of the annular tamper-indicating band from the closure's annular sidewall since the non-frangible portion will keep the tamper-indicating band attached to the closure annular sidewall. When the frangible portion is represented by spaced-apart bridges, they are dimensioned so that they will lack sufficient strength to maintain their integrity upon attempted removal of the closure from the container but are sufficiently strong to resist fracturing when the closure is fitted to the container.

The annular tamper-indicating band features an annular upper portion which depends downwardly from the annular area. The band additionally has an annular lower portion which comprises a plurality of spaced-apart tabs with each tab connected to its neighboring tab by way of a flexible web. Each of the tabs can optionally have a scalloped recess at their lower extent to improve circumferential flexibility when the annular lower portion is hinged from its molded position to its utilitarian position as hereinafter described. To connect the annular upper portion to the annular lower portion there is provided an annular hinge. The annular hinge can be provided by a continuous thinned wall web or it can be provided by a plurality of thinned wall hinges which are separated one from the other by slots or openings.

Further, the tamper-indicating band will have its own frangible area which extends axially through the annular upper and lower portions and the flexible web. This vertical or axial frangible area is dimensioned to fracture upon removal of the closure from the container at a time subsequent to the fracture of at least a part of the frangible portion of the before-described annular area.

These and other features of this invention contributing to satisfaction in use and economy in manufacture will be more fully understood when taken in connection with the following description of preferred embodiments of this invention and the accompanying drawings in which identical numbers refer to identical parts and in which.

Figure 1:
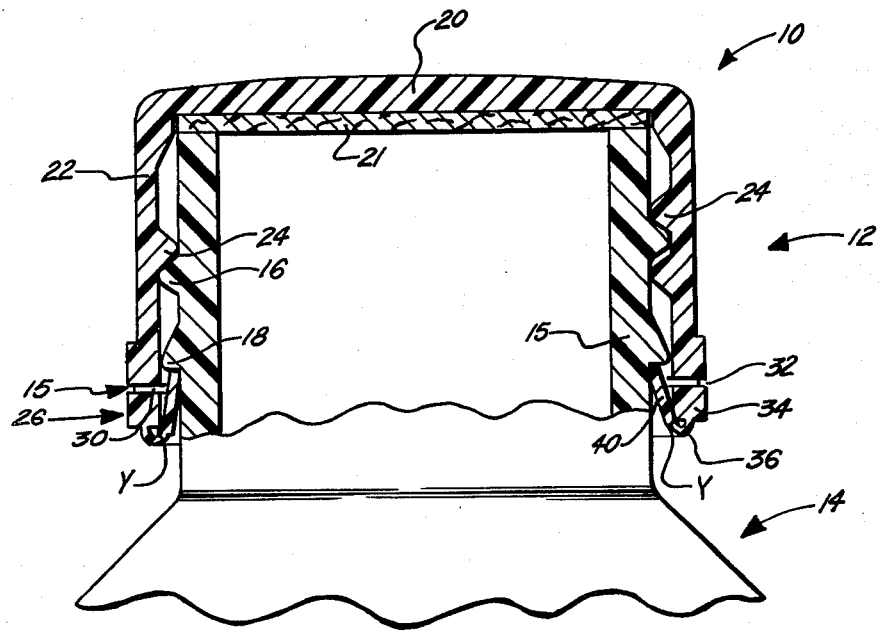
FIG. 1 is a sectional view of a closure of this invention fitted to a container.
Figure 2:
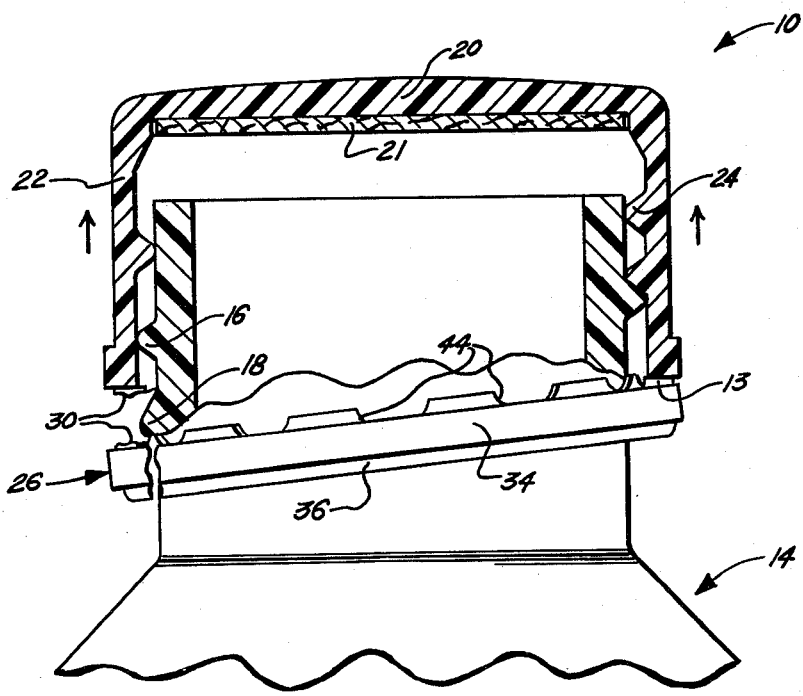
FIG. 2 is a sectional view of the closure shown in FIG. 1 as the closure is removed from the container.

Referring now to FIGS. 1–7 and 15, there can be seen a package, generally designated by the numeral 10, composed of a closure of this invention, generally designated by the numeral 12, and a container, generally designated by the numeral 14.

Container 14 can be of any conventional material, for example, it may be of a thermoplastic material such as polyvinyl chloride, polyethylene terephthalate, polyethylene, etc., or it may be of glass. Container 14 has a neck portion which carries on its outside wall a helical thread 16. Beneath, but adjacent to helical thread 16, is annular outwardly extending flange 18. Note that annular flange 18 has an upper outer annular surface which is sloped downwardly and outwardly to meet an essentially horizontal lower annular surface. Such a configuration is advantageous when utilizing closures of this invention as hereinafter described.

Closure 12 has a circular top wall 20 and an annular downwardly depending sidewall 22. About the inside surface of annular sidewall 22 is a helical closure thread 24. Closure thread 24 is configured and dimensioned to be cooperative with container thread 16 to achieve fitment of cap 12 onto container 14. Nested against the inside surface of top wall 20 is liner 21. Liner 21 is utilized to effect a seal between closure 12 and the mouth of container 14 as is seen in FIG. 1. However, it should be realized that the closures of this invention are not limited to the utilization of a liner to effect this sealing but that the closures can also utilize linerless sealing systems which are well-known to those skilled in the art. Generally speaking, such linerless systems utilize downwardly extending fins which emanate from the inside surface of top wall 20, or at the juncture of top wall 20 and annular sidewall 22. These fins coact with the mouth portion of container 14 to achieve the desired seal.

Closure 12 has integrally formed with sidewall 22, annular tamper-indicating band 26. Annular tamper-indicating band 26 is attached to sidewall 22 by way of annular area 28. Annular area 28 has frangible portion 15, hereinafter described, of reduced strength which is designed to fracture in accordance with the tamper-indicating operation of closure 12. Annular area 28 also has a non-frangible portion 13. For the embodiments shown in the drawings, frangible portion 15 is formed by a plurality of slots 32 which alternate with a plurality of fracturable bridges 30. The width and depth of fracturable bridges 30 is dependent upon the expected stresses to be applied thereto upon closure opening and upon the material which closure 12 is made. For example, if the closure is made of polypropylene, and there are 8 to 12 fracturable bridges equiangularly spaced about frangible portion 15, then for conventional usage, fracturable bridges 30 can be designed to have a width of from about 0.020 to about 0.030 inches and a depth of from about 0.007 to about 0.010 inches. In any event, the configuration and dimensions of fracturable bridges 30 is best determined by empirically testing the closure on a container and under the conditions expected to be encountered in the marketplace.

Frangible portion 15 may also have other configurations. For example, this area may be formed by a groove cut into the outside of the closure sidewall. The groove defines an area of reduced thickness and thus would represent a zone of weakness capable of shearing upon removal of closure 12 from container 14. Other frangible area configurations may be used since the particular configuration is not critical to the operation of the closures of this invention so long as the frangible area is capable of shearing or fracturing under conventionally expected removal forces.

Immediately below annular area 28 is annular tamper-indicating band 26. Annular tamper-indicating band 26 has an annular upper portion 34 attached to annular lower portion 38 by way of annular hinge 36. Annular hinge 36 is an annular area of reduced thickness which allows for flexing along the annular line defined by annular hinge 36. The thickness of annular hinge 36 is dependent upon the material from which closure 12 is made. Some thermoplastic materials will exhibit greater resistance to bending and thus need to be made fairly thin. Other thermoplastic materials, however, are easier to bend but need a greater thickness to guard against stress fracture. It has been found that when utilizing polypropylene as the material of construction for closure 12, that annular hinge 36 should have a thickness within the range of from about 0.008 to about 0.014 inches.

Annular lower portion 38 is comprised of a plurality of spaced apart tabs 40 which are connected by way of flexible webs 42. At the lower portion of each tab 40, for the embodiment shown, there is a scalloped recess 44. Scalloped recesses 44 can be either angular or arcuate. The arcuate form is used for the embodiments shown in the drawings.

Further, annular tamper-indicating band 26 has a vertical frangible area 17. Note that the frangible area represents a weakened line extending across annular upper portion 34, annular hinge 36 and annular lower portion 38. Vertical frangible area 17 is preferably generally opposite non-frangible portion 13. Frangible area 17 is best formed by providing that the annular upper and lower portions on the annular hinge each have an area of reduced thickness. The ultimate reduction in thickness for each of the portions and the hinge to achieve fracturing of the tamper-indicating band upon closure removal will be dependent on the material of closure construction. For polypropylene, the reduced thickness will be in the range of from about 0.006 to about 0.012 inches. If annular hinge 36 or annular lower portion 38 at frangible area 17 have thicknesses within this range, they need not be further reduced in thickness. By having non-frangible area 13 and vertical frangible area 17, the removal of tamper-indicating band 26 with the removal of the rest of the closure from container 14 is assured. Such removal is advantageous when container 14 is a returnable container as the bottlers will not have the added expense of removing tamper-indicating band 26 from a returned container before the refilling of same.

Figure 3:
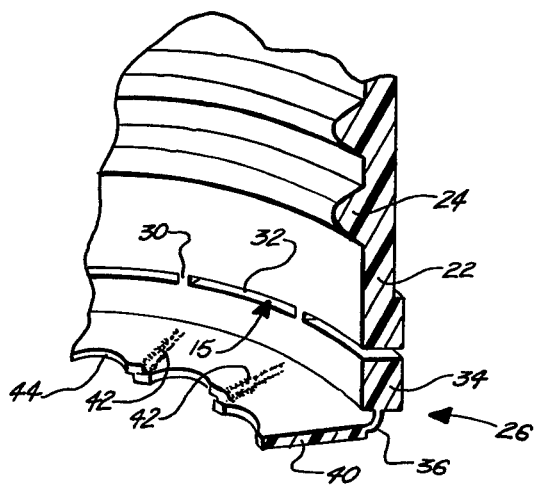
FIG. 3 is a partial enlarged sectional view of the closure shown in FIG. 1 with the tamper-indicating band at its midway point as it is turned inwardly.
Figure 4:
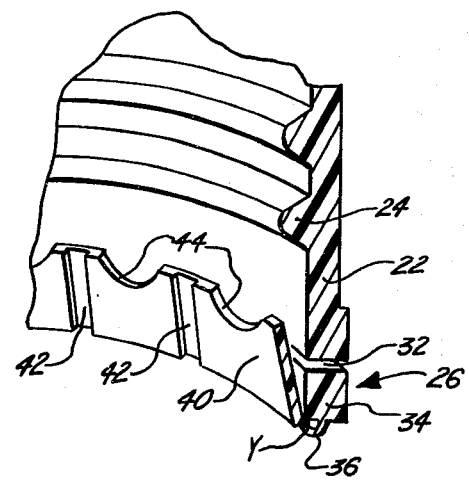
FIG. 4 is a partial enlarged sectional view of the closure shown in FIG. 1 showing the position of the tamper-indicating band after it has been hinged inwardly.
Figure 5:
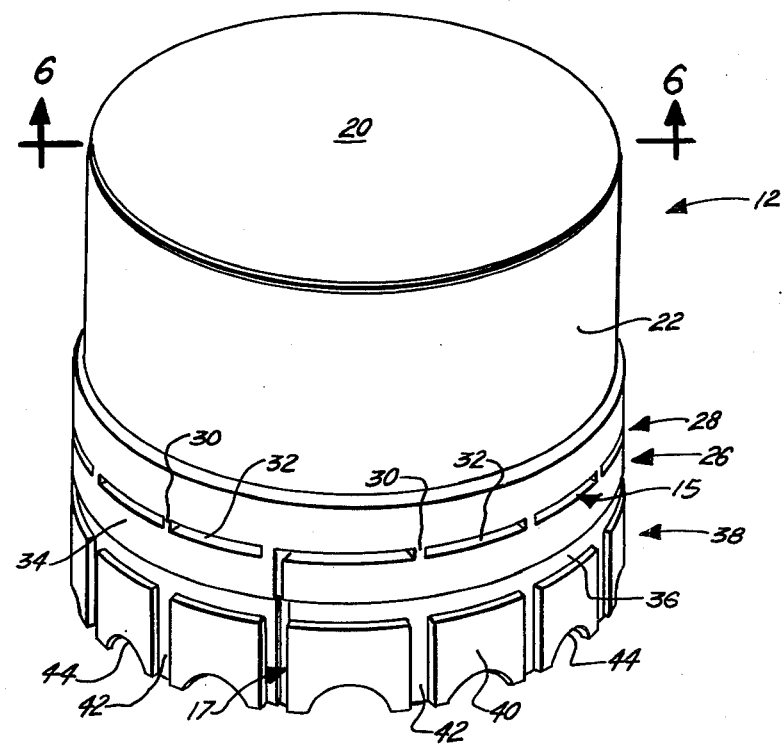
FIG. 5 is a perspective view of the closure shown in FIG. 1.
Figure 6:
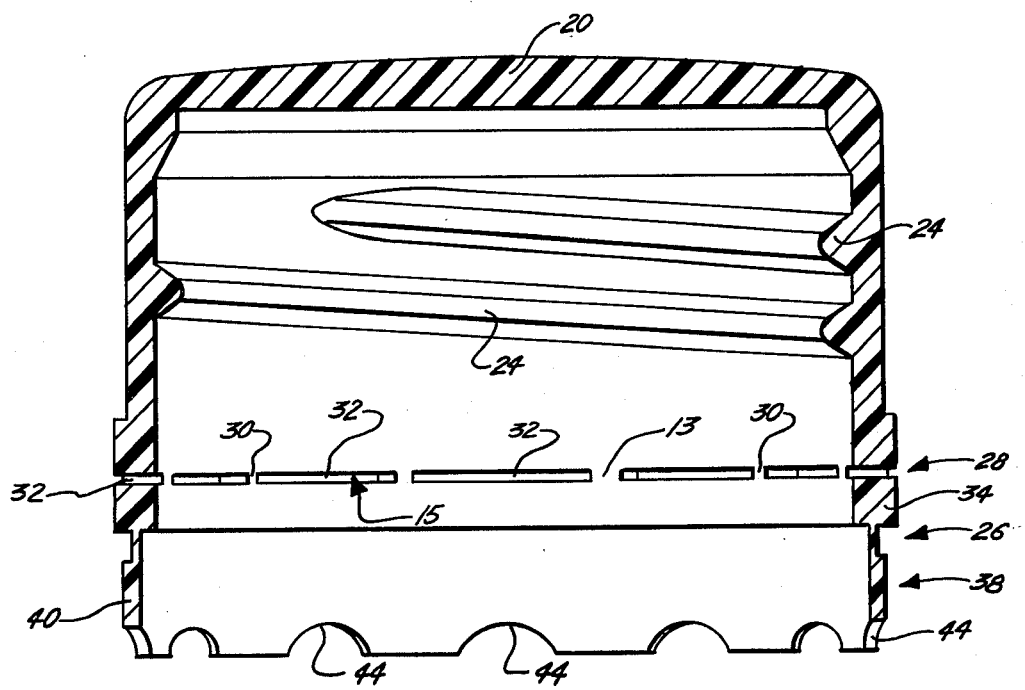
FIG. 6 is a sectional view taken through sectional line 6—6 in FIG. 5.
Figure 7:
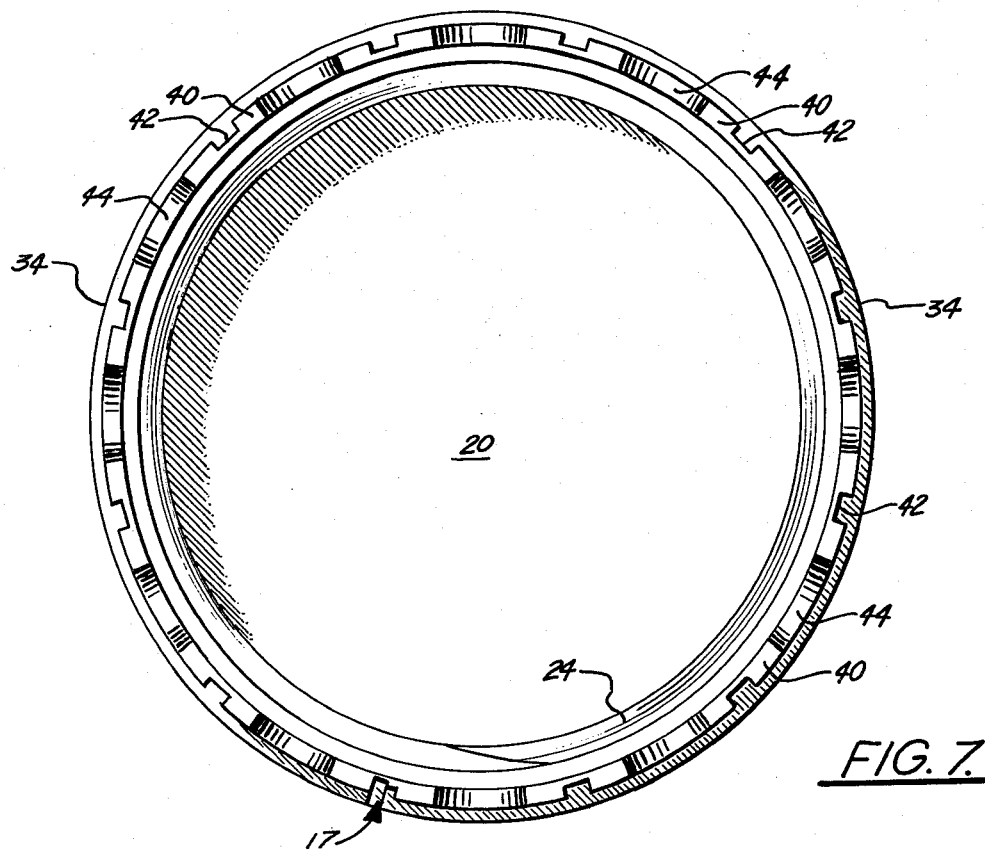
FIG. 7 is a bottom plan view of the closure shown in FIG. 1.
Figure 8:
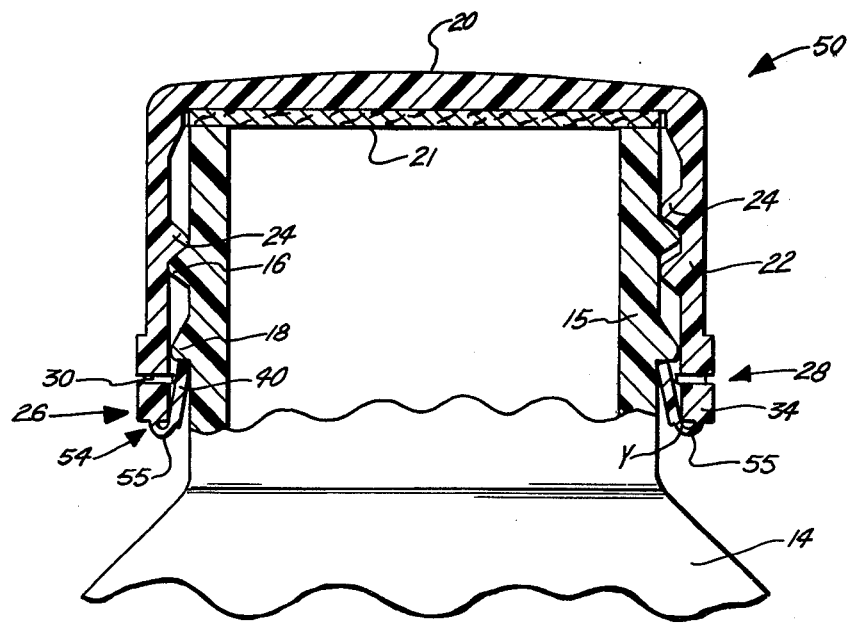
FIG. 8 is a sectional view showing a second closure of this invention fitted to a container.
Figure 9:
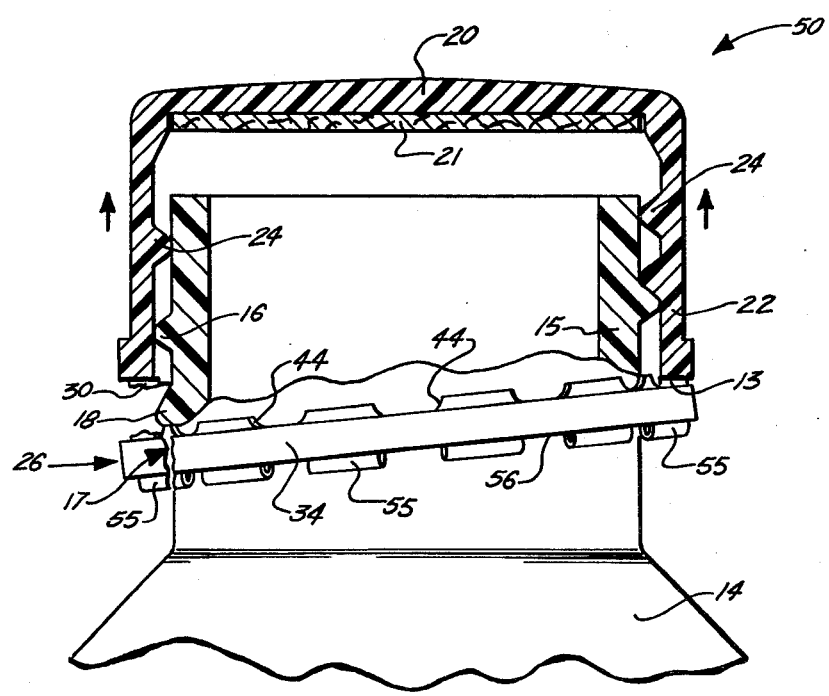
FIG. 9 is a sectional view of the closure shown in FIG. 8 as the closure is removed from the container.

Functionally, the closures of this invention are the paragon of simplicity. As is shown in FIG. 5, closure 12 is molded so that annular tamper-indicating band 26 is in the down position. To prepare closure 12 for use on container 14, it is necessary to fold inwardly and upwardly lower portion 38. The folding will occur about annular hinge 36. This inward and upward fold requires that annular lower portion 38 have the circumferential flexibility to accommodate the varying circumferences encountered as it moves from its molded position, shown in FIG. 5, through the intermediate position shown in FIG. 3 and the final at rest position shown in FIG. 4. As can be seen in FIG. 3, the inward folding of annular lower portion 38 results in its having a reduced circumference at its end most distal from annular hinge 36. This reduction in circumference and the resultant stress, however, is at least partially accommodated by the folding of flexible webs 42. Also stress realized in tabs 40 is relieved somewhat by the use of scalloped recesses 44. Once annular lower portion 38 passes through the position shown in FIG. 3 towards the position shown in FIG. 4, the stresses realized are abated. When annular lower portion 38 is in the FIG. 4 position, the various forces acting on it are in equilibrium. As can be appreciated, annular hinge 36, since it is of a resilient material, will be urging return of annular lower portion 38 to its original molded position, shown in FIG. 5. However, to arrive at this position, it will be necessary to apply sufficient force to pass annular lower portion 38 back through the position of FIG. 3. As mentioned previously, the position of FIG. 3 is a stress position and thus, considerable force must be utilized to go through that position. The resiliency in annular hinge 36 is not sufficient to effect such movement of annular lower portion 38. Annular lower portion 38 therefore is held in the position shown in FIGS. 1, 2 and 4. Note also that annular lower portion 38 is positioned slightly outwardly from the inside surface of sidewall 22. This position can be encouraged by the placing of annular hinge 36 outside of the inside wall of annular upper portion 34 so that the lower inside part of annular upper portion 34 abuts against tabs 40 as shown in FIG. 4 at "Y". This positioning of annular lower portion 38 inwardly of the inside surface of the closure sidewall is advantageous in that it ensures that tabs 40 of annular lower portion 38 make good interfering contact with annular container flange 18. This interfering contact can be achieved without displacement of annular lower portion 38 from the inside surface of sidewall 22 by providing projections on the tab and/or on the lower inside part of annular upper portion 34. These projections will provide the interfering contact which is desired.

The inward and upward folding of annular lower portion 38 is accomplished after the injection molding of closure 12. This inward folding can be accomplished by utilization of simple punching means as is well known to those skilled in the art.

Once annular lower portion 38 has been folded inwardly to the position shown in FIGS. 1 and 4, the closure can be simply screwed onto container 14. As closure 12 is screwed onto container 14, annular lower portion 38 will make contact with annular container flange 18. Since annular container flange 18 has a downwardly sloped upper annular surface to act as a cam surface and annular lower portion 38 is resiliently hinged, passage of annular lower portion 38 thereover is facilitated without the realization of great stress in annular frangible area 28. By having annular lower portion 38 resiliently hinged, a spring action is realized as annular lower portion 38 passes over annular container flange 18. Therefore, annular lower portion 38 is able to flex resiliently away from container annular flange 18 thereby mitigating stress caused by the passage of annular lower portion 38 over annular container flange 18.

After closure 12 has been fitted to container 14, it can be seen that the distal end of annular lower portion 38 is in abutment against the horizontal lower annular surface of annular flange 18. This position assures an interfering fit between the horizontal lower annular surface and annular lower portion 38 which can only be overcome by forces which are larger than can be withstood by annular frangible area 38. Further, since the forces of removal bear on annular lower portion 38 through its vertical width it is placed in compression, and since annular lower portion 38 is strongest against deformation due to compression the rigidity of the interfering fit is enhanced during closure removal.

As unthreading of closure 12 occurs, closure 12 will move axially and upward in response to the unthreading torque. Annular tamper-indicating band 26, however, is blocked from such axial upward movement due to the before-mentioned interference between triangular projections 44 and the horizontal lower annular surface of annular flange 18. Continued application of torque onto closure 12 will result in tension forces being realized throughout the entire closure sidewall area. Since frangible portion 15 of annular area 28 is the weakest link throughout the closure sidewall area, a fracture will ultimately occur there (see FIGS. 2 and 15). As the fracture occurs, non-frangible area 13 holds to tamper-indicating band 26. Continued unthreading of the closure therefore causes a continued pull axially upward on tamper-indicating band 26. This upward pull places vertical frangible area 17 in stress sufficient to cause its fracture. Once this last fracture occurs, tamper-indicating band 26 can expand outwardly so that the position of interference between container flange 18 and triangular projections 44 is for the most part lost. Thus, continued removal of closure 12 along with tamper-indicating band 26 can occur. The tamper-indicating function is achieved as the various fractures are readily seen by the consumer. Since tamper-indicating band 26 is still attached to the rest of the closure, via non-frangible area 13, container 14 can be simply cleaned, sterilized and refilled without concern for removal from the container of tamper-indicating band 26.

Another closure embodiment of this invention is shown in FIGS. 8–14. The closure shown in FIGS. 8–14 is identical in many respects with the closure shown in FIGS. 1–7 and thus, for convenience's sake, the description made for some parts in discussing FIGS. 1–7 is equally applicable to the identical part shown in FIGS. 8–14 and therefore, will not be repeated. The identical parts are designated by the same numbers for both embodiments.

Figure 10:
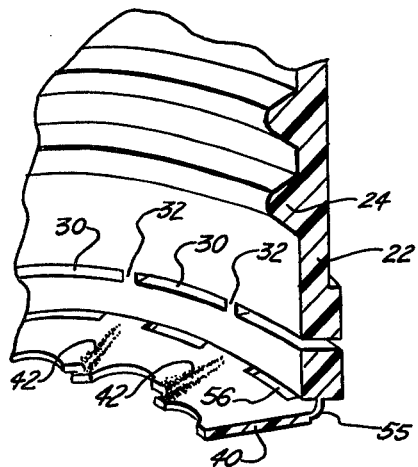
FIG. 10 is a partial enlarged sectional view of the closure shown in FIG. 8 with the tamper-indicating band at its midway point, as it is turned inwardly.
Figure 11:
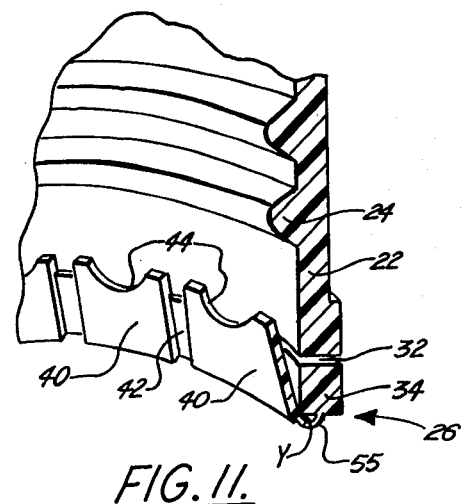
FIG. 11 is a partial enlarged sectional view of the closure shown in FIG. 8 showing the position of the tamper-indicating band after it has been hinged inwardly.
Figure 12:
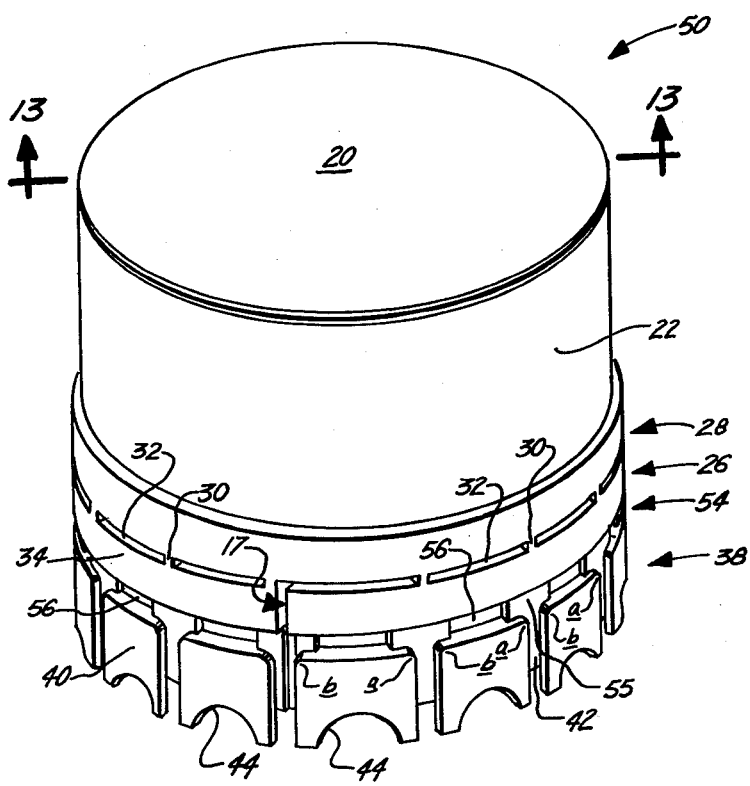
FIG. 12 is a perspective view of the closure shown in FIG. 8.
Figure 13:
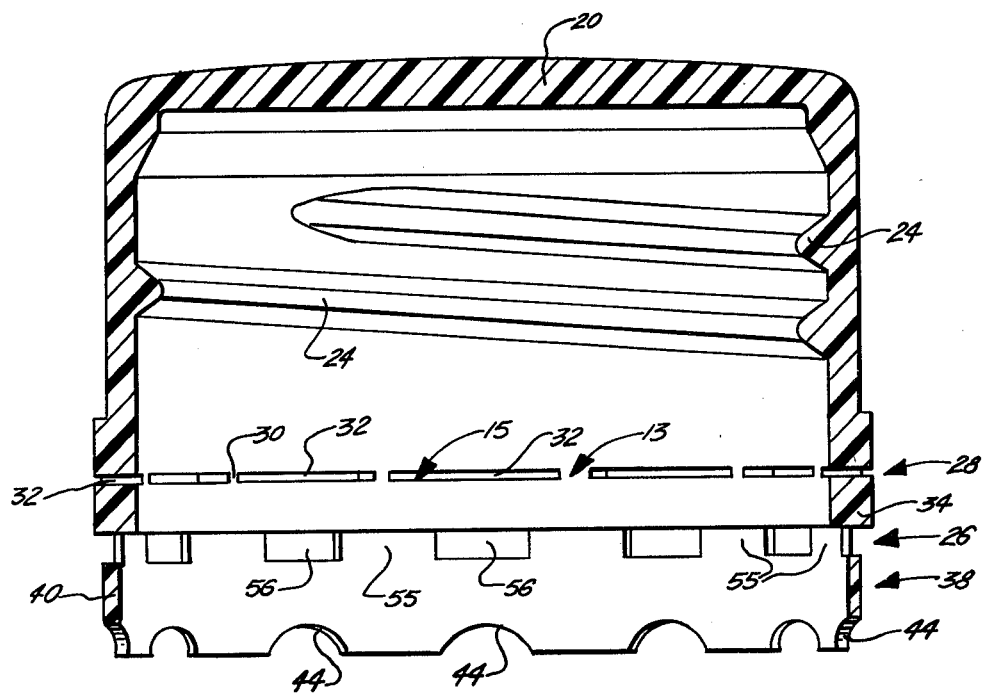
FIG. 13 is a sectional view taken through a sectional line 6—6 in FIG. 8.
Figure 14:
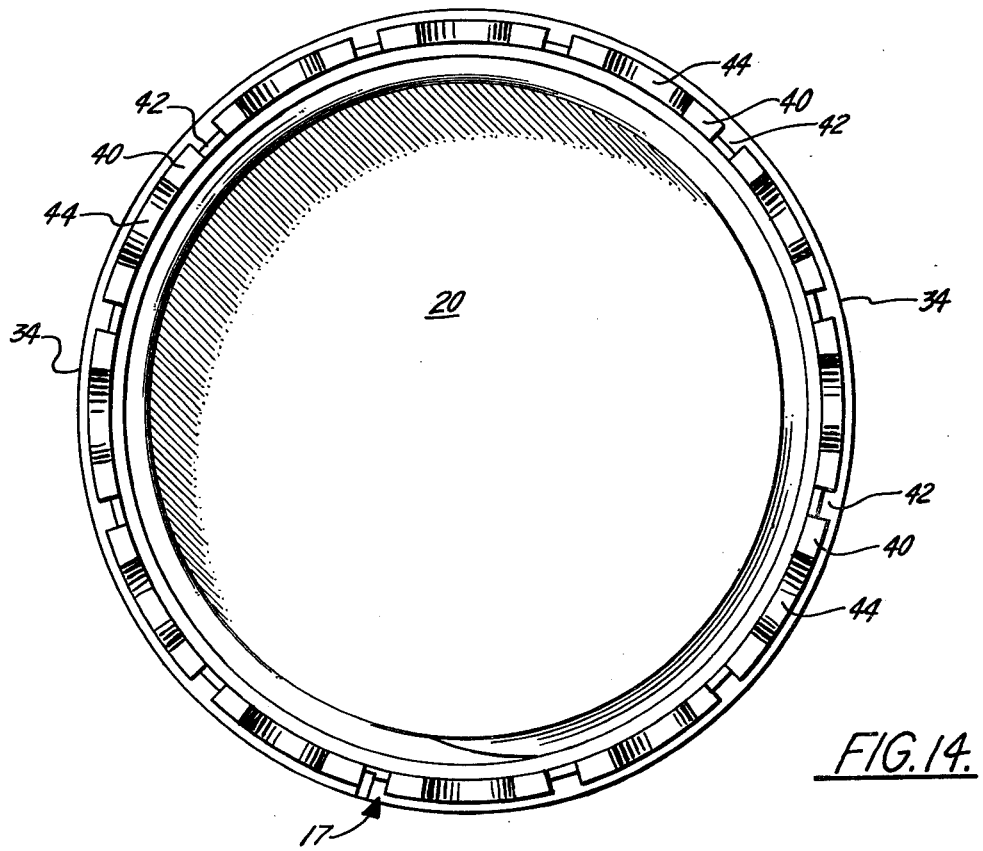
FIG. 14 is a bottom plan view of the closure shown in FIG. 8.
Figure 15:
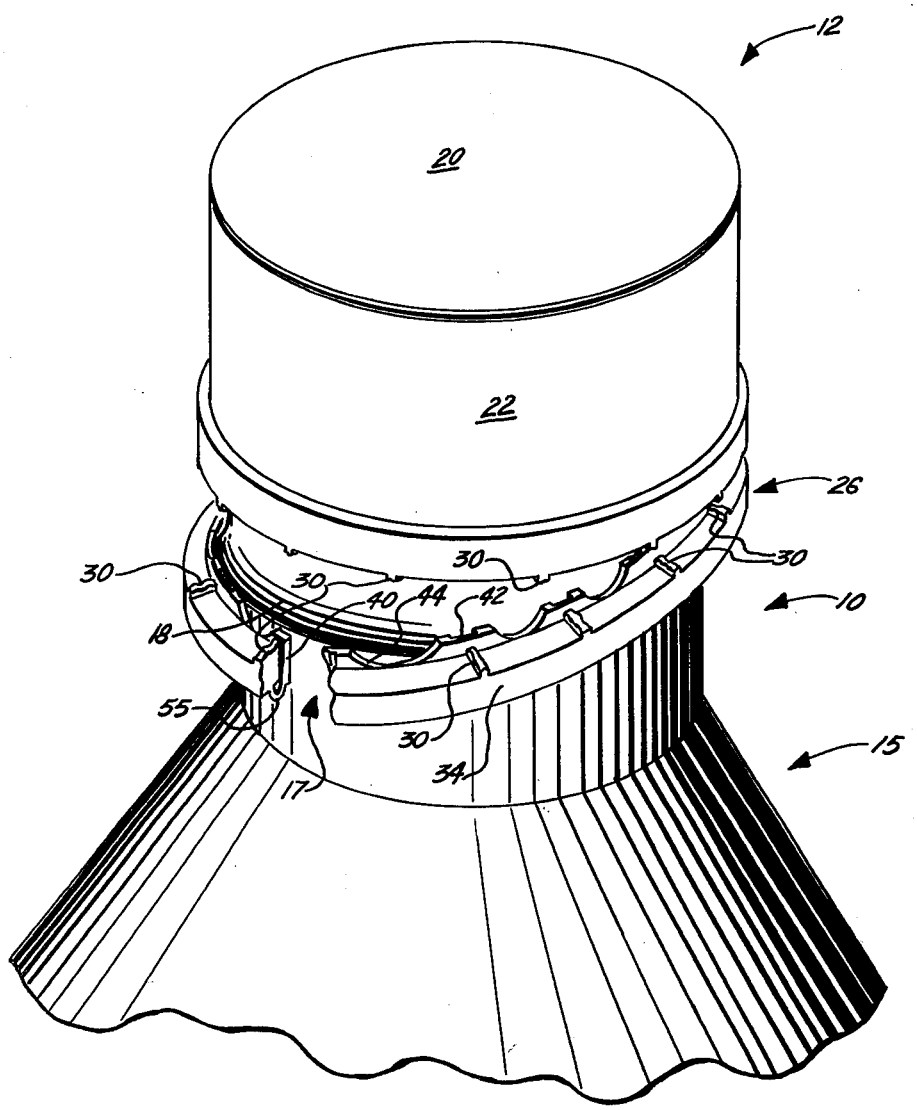
FIG. 15 is a perspective view of the closure shown in FIG. 1 showing the closure as it is removed from the container.

As is shown in FIGS. 10–12, closure 50 differs from closure 12, shown in FIGS. 1–7, as the former closure has a differently configured annular hinge 54. Note that annular hinge 54 is formed by a plurality of spaced-apart hinged segments 55 which are separated by gaps 56. It has been found that by providing gaps 56 between hinged segments 55 that a more flexible annular hinge 54 can be effected. Hinged segments 55 connect to tabs 40 at the tab upper shoulders. Note that hinged segments 55 connect the upper right shoulder, designated by the letter "a", of one tab to the upper left shoulder, designated by the letter "b", of a neighboring tab. Such a positioning of hinged segments 55 is necessary so as to maintain structural integrity in annular tamper-indicating band 26.

Functionally, closure 50 operates in the same manner as does closure 12 described above.

I claim:

1. An integrally-formed tamper-indicating thermoplastic closure for fitment to a container having a threaded neck portion and an outwardly extending annular flange adjacent to and beneath the threaded neck portion, said tamper-indicating closure comprising:

a. a top wall;
   b. an annular sidewall downwardly depending from said top wall, said sidewall having about its inside surface a closure thread for cooperation with said container thread to achieve fitment of said closure to said container;

c. an annular tamper-indicating band connected to the lower portion of said annular sidewall by way of an annular area, which annular area comprises a frangible portion and a non-frangible portion, said annular tamper-indicating band having, (i) an annular upper portion depending downwardly from said annular frangible area;

(ii) a circumferentially flexible annular lower portion comprising a plurality of spaced apart tabs with each tab connected to its neighboring tab by way of a flexible web, (iii) an annular intermediate portion which provides an annular hinge to hingedly connect said annular upper portion and said annular lower portion one to the other whereby said annular lower portion can be folded inwardly and upwardly to position said tabs in a position of interference with said container annular flange when said closure is fitted to said container, and, (iv) a vertical frangible area which forms a fracturable line across said annular upper and lower portions and said annular intermediate portion.

2. The tamper-indicating closure of claim 1 wherein said frangible portion is an area of reduced thickness and wherein said vertical frangible area and said non-frangible portion are generally opposite each other.

3. The tamper-indicating closure of claim 1 wherein said frangible portion comprises a plurality of spaced apart fracturable bridges and wherein said vertical frangible area and said non-frangible portion are generally opposite each other.

4. The tamper-indicating closure of claim 1 wherein said annular hinge is a continuous web of reduced thickness.

5. The tamper-indicating closure of claim 1 wherein said annular hinge comprises alternating openings and hinges.

6. The tamper-indicating closure of claim 5 wherein each of said hinges is connected to adjacent corners of neighboring tabs.

7. The tamper-indicating closure of claim 1 wherein each of said tabs has a scalloped recess at its lower portion.

8. The tamper-indicating closure of claim 7 wherein said scalloped recesses are arcuate recesses.

9. The tamper-indicating closure of claim 7 wherein said scalloped recesses are angular recesses.

10. The tamper-indicating closure of claim 1 wherein there are provided protuberances on either of or both of said annular upper portions and said tabs whereby said tabs are urged toward said container when said tabs are in said position of interference.

11. The tamper-indicating closure of claim 1 wherein said annular hinge is of a thickness less than the thickness of said tabs at their uppermost extent and of said upper annular portion and wherein the connection of said annular hinge to said upper portion is displaced outwardly from the inside surface of the upper portion.

12. The tamper-indicating closure of claim 11 wherein said frangible portion is an area of reduced thickness.

13. The tamper-indicating closure of claim 11 wherein said frangible portion comprises a plurality of spaced apart fracturable bridges and said non-frangible portion is a non-fracturable bridge spaced between two of said frangible bridges.

14. The tamper-indicating closure of claim 11 wherein said annular hinge comprises alternating openings and hinges.

15. The tamper-indicating closure of claim 14 wherein each of said hinges are connected to adjacent corners of neighboring tabs.

16. The tamper-indicating closure of claim 11 wherein each of said tabs has a scalloped recess at its lower portion.

17. The tamper-indicating closure of claim 16 wherein said frangible portion is an area of reduced thickness, said annular hinge is a continuous web of reduced thickness, and wherein said scalloped recesses are arcuate recesses.

18. The tamper-indicating closure of claim 16 wherein said frangible portion comprises a plurality of spaced apart fracturable bridges, said annular hinge comprises alternating openings and hinges of reduced thickness, each of said hinges being connected to adjacent corners of said neighboring tabs, and wherein said scalloped recesses are arcuate recesses.

19. The tamper-indicating closure of claim 11 wherein said frangible portion is an area of reduced thickness and wherein said annular hinge comprises alternating openings and hinges of reduced thickness, each of said hinges being connected to adjacent corners of neighboring tabs.

20. The tamper-indicating closure of claim 11 wherein said frangible portion comprises a plurality of spaced apart fracturable bridges and wherein said annular hinge is a continuous web of reduced thickness.

21. The tamper-indicating closure of claim 1 wherein said closure is of polypropylene.

* * * * *

UNITED STATES PATENT AND TRADEMARK OFFICE
CERTIFICATE OF CORRECTION

PATENT NO. : 4,458,821
DATED : July 10, 1984
INVENTOR(S) : Efrem M. Ostrowsky

It is certified that error appears in the above-identified patent and that said Letters Patent is hereby corrected as shown below:

The term of this patent subsequent to July 10, 2001, has been disclaimed.

Signed and Sealed this

Third Day of September 1985

[SEAL]

Attest:

DONALD J. QUIGG

Attesting Officer   Acting Commissioner of Patents and Trademarks - Designate